United States Patent [19]

Hunts

[11] Patent Number: 4,961,524

[45] Date of Patent: Oct. 9, 1990

[54] CAR CARRIER STRAPPING AID

[76] Inventor: Rick E. Hunts, 885 Barsby St., Vista, Calif. 92083

[21] Appl. No.: 431,990

[22] Filed: Nov. 6, 1989

[51] Int. Cl.$^5$ .............................................. B60R 9/048
[52] U.S. Cl. .................................... 224/324; 224/309
[58] Field of Search ............... 224/315, 319, 324, 325, 224/326, 329, 330, 331, 309

[56] References Cited

U.S. PATENT DOCUMENTS

| | | | |
|---|---|---|---|
| 2,434,387 | 1/1948 | Brandt | 224/324 |
| 3,960,301 | 6/1976 | Miller | 224/324 |
| 4,469,260 | 9/1984 | Delahanty | 224/324 |
| 4,735,350 | 4/1988 | Kamaya | 224/315 |

Primary Examiner—Linda J. Sholl
Attorney, Agent, or Firm—Henri J. A. Charmasson

[57] ABSTRACT

A device for facilitating the strapping of a load on a roof-mounted luggage rack which comprises a clamp attachable to one of the beams of the rack with a boom projecting in an upward slant toward an opposite side of the rack. The boom carries a strap which attaches at one end to the clamping mechanism of the boom and has the opposite end dangling past the end of the boom where it can be grabbed and tied to the rack, thus securing the load and at the same time securely clamping the device on the beam of the luggage rack.

5 Claims, 1 Drawing Sheet

CAR CARRIER STRAPPING AID

BACKGROUND OF THE INVENTION

This invention relates to automobile luggage racks, and more specifically to strapping devices used in connection therewith.

When a large or bulky object needs to be strapped on top of an automobile luggage rack it is necessary to attach the strap to one side of the rack and then throw the loose end over the object toward the other side of the car where the loose end can then be strapped to the opposite side of the rack. If the vehicle has a certain height, or if the object is particularly bulky, the above-described procedure must be repeated several times as straps are swung over the load from one side to the other of the vehicle. This process can be time-consuming and not very effective. Certain utilitarian vehicles have a roof carrier which is used routinely to transport a ladder of some other often-used implement. Water-sport enthusiasts also routinely carry surfboards, sailboards, kayaks and even catamarans on vehicle rooftops. In such case, it would be advantageous to have a convenient way to secure those objects on a vehicle rooftop rack without following the cumbersome above-described procedure.

SUMMARY OF THE INVENTION

The principal and secondary objects of this invention are to provide a simple clamping device which may be used to secure various types of objects on the vehicle roof rack without having to work from both sides of the vehicle to secure one or more straps to left and right side beams of the luggage rack.

This and other objects are achieved by providing a simple, flexible boom which is mounted on a base that clamps on one of the luggage rack beams and extends in a upwardly slanted position across the rooftop, channeling a strap which at one end attaches to the clamping mechanism of the bracket and, at the other end, has a dangling section with a buckle or other fastening means for attachment to another part of the luggage rack.

DESCRIPTION OF THE PREFERRED EMBODIMENT OF THE INVENTION

Figure 1:
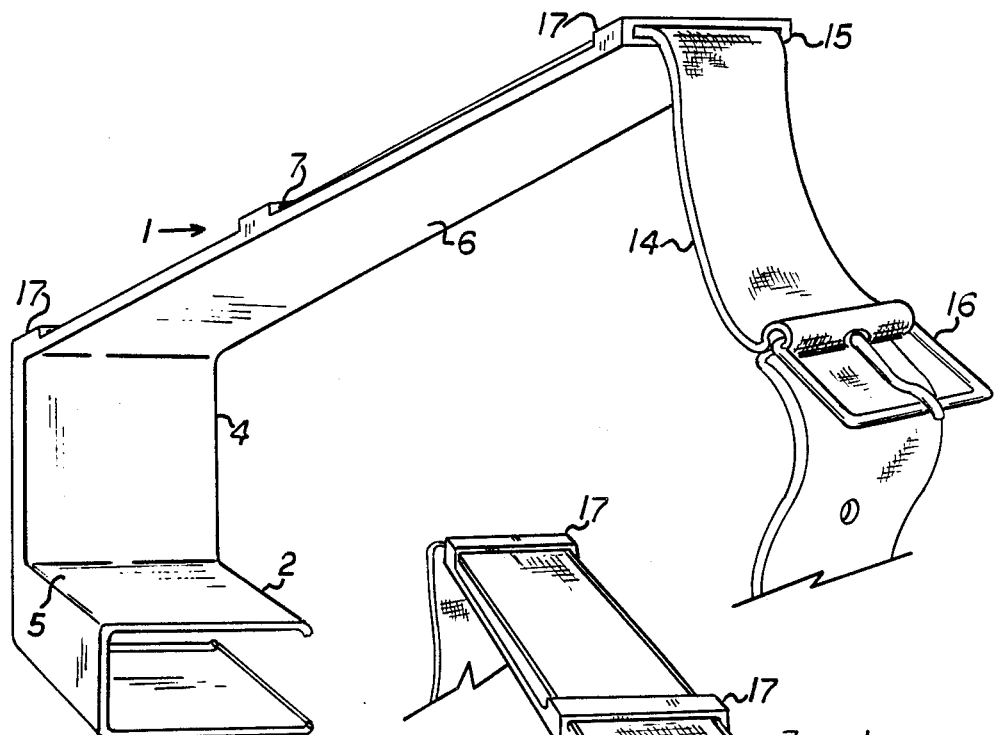
FIG. 1 is a front, left side and bottom perspective view of the preferred embodiment of the invention.
Figure 2:
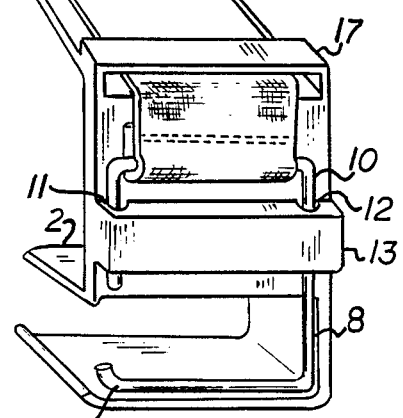
FIG. 2 is a back, right side and top perspective view thereof.
Figure 3:
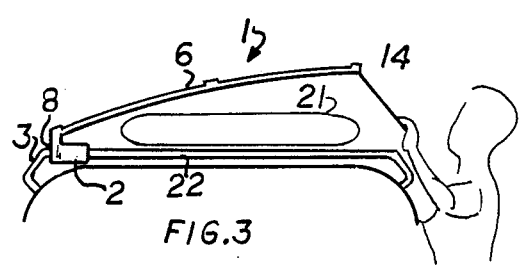
FIG. 3 illustrates the strapping of an object by means of the embodiment on a vehicle rooftop rack.

Referring now to the drawing, there is shown in FIGS. 1 and 2 a car carrier strapping aid 1. The strapping aid comprises a C-shaped bracket 2 which is shaped and dimensioned to capture a beam of a vehicle, roof-mounted luggage rack 3 as shown in FIG. 3. A vertical projection 4 extends from the upper surface 5 of the C-shaped bracket 2 and supports a flexible boom 6 which extends in a upwardly slanted direction. A strap 7 is mounted on the boom in a manner that allows it to slide longitudinally in relation to the boom 6. One end of the strap is connected to a C-shaped hook which has one section 9 shaped and dimensioned to correspond to the outline of the lower half of the C-shaped bracket 2.

The shank and upper part 10 of the hook 8 is slidingly captured by a couple of bores 11 and 12 drilled through a ledge 13 which forms an integral part of the back of the vertical extension 4. When the lower arm 9 of the hook is kept in a parallel and aligned position with the lower half of the C-shaped clamp 2 and passes under the beam 3, the pull of the strap forces the hook 8 upward. This action securely clamps the entire assembly securely on the beam 3. It should be understood that the ledge 13 is only provided to keep the hook 8 together with the bracket 2 as a single assembly, and could be omitted to simplify the manufacture of the device. The strap 7 runs from its attachment to the upper portion 10 of the hook 8, over and along the upper surface of the boom 6. An opposite end section 14 extends beyond the outer end 15 of the boom and has a buckle 16 for attachment to the luggage rack. Loops 17 spaced apart along the boom 6 capture the strap 7, and prevent it from slipping off the boom.

Figure 4:
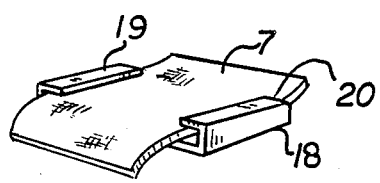
FIG. 4 is a section of an alternate embodiment of the device boom.

FIG. 4 illustrates an alternate embodiment 18 of the boom 6 where the loops 17 are replaced by a pair of flanges 19, 20 which run along the lateral edges of the boom channeling the strap 7 therebetween.

FIG. 3 illustrates the use of the strapping aid to secure a load 21 on a roof-mounted automobile rack. The device is installed on one side of the rack with the C-shaped bracket 2 and hook 8 engaged over a rack beam 22. The device is oriented so that the boom 6 projects across and above the load with the free end 14 of the strap 7 dangling from the end of the boom at the opposite side of the vehicle. The free end 14 of the strap can then be pulled to securely clamp the strapping aid on the beam 22, then fastened to a convenient section of the rack.

It should be understood that this type of strapping aid can be oriented in a variety of ways and mounted on either longitudinal or transversal beams of the rack. The boom can be dimensioned and shaped to accommodate a variety of loads. In some instances, two or more booms could project from the same bracket in different directions and at different angles to accommodate a variety of strapping arrangements and loads.

While the preferred embodiment of the invention has been described and modification have been suggested, other modifications may be made and other embodiments may be devised without departing from the spirit of the invention and the scope of the appended claims.

What is claimed is:

1. In combination with a roof-mounted automobile luggage rack made from a plurality of beams, a strapping device which comprises:
   a bracket adapted to engage one of said beams;
   means for clamping said bracket on said beam;
   a flexible boom extending from said bracket in a upwardly slanted direction; and
   a strap connected at a first end to said means for clamping, said strap running along the entire length of said boom and having an opposite end section extending beyond said boom.

2. The combination of claim 1, wherein said strap comprises means for fastening said end section to one of said beams.

3. In combination with a roof-mounted automobile luggage rack made from a plurality of beams, a strapping device which comprises:
   a bracket adapted to engage one of said beams;
   means for clamping said bracket on said beam;

a flexible boom extending from said bracket in a upwardly slanted direction;

a strap connected to a first end to said means for clamping, said strap running along the entire length of said boom and having an opposite end section extending beyond said boom;

wherein said strap comprises means for fastening said end section to one of said beams;

wherein said bracket comprises:
  a C-shaped member;
  a projection extending upwardly from an upper surface of said member; and wherein said means for clamping comprises a hook having a shank slidingly supported by said projection and forming an open loop mounted parallelly to said C-shaped member, and being shaped and dimensioned to engage one of said beams.

4. The combination of claim 3 wherein said boom comprises an elongated strip having a top surface lined with a pair of lateral flanges sized and dimensioned to channel said strap therebetween.

5. The combination of claim 3, wherein said flexible boom has a plurality of spaced-apart loops through which said strap is engaged.

* * * * *